United States Patent
Yang

(10) Patent No.: US 8,562,469 B2
(45) Date of Patent: Oct. 22, 2013

(54) HYBRID POWER TRAIN HAVING EPICYCLIC TYPE CLUTCH DEVICE

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/045,668

(22) Filed: Mar. 11, 2011

(65) Prior Publication Data

US 2012/0232729 A1  Sep. 13, 2012

(51) Int. Cl.
*F16H 37/08* (2006.01)
*B60W 10/02* (2006.01)
*B60K 6/445* (2007.10)

(52) U.S. Cl.
CPC ........... *F16H 37/0826* (2013.01); *B60W 10/02* (2013.01); *B60K 6/445* (2013.01); *Y02T 10/6286* (2013.01); *Y02T 10/6239* (2013.01); *Y10S 903/946* (2013.01)
USPC .......... 475/5; 475/151; 475/211; 180/65.235; 903/946

(58) Field of Classification Search
USPC ............ 701/22, 51, 67; 475/9, 149–157, 269, 475/273; 180/369, 372; 192/3.51–3.52
See application file for complete search history.

(56) References Cited

U.S. PATENT DOCUMENTS

| | | | | |
|---|---|---|---|---|
| 5,856,709 A | * | 1/1999 | Ibaraki et al. | 290/45 |
| 6,344,008 B1 | * | 2/2002 | Nagano et al. | 475/1 |
| 7,108,087 B2 | * | 9/2006 | Imai | 180/65.23 |
| 7,377,876 B2 | * | 5/2008 | Yang | 477/3 |
| 2009/0118950 A1 | * | 5/2009 | Heap et al. | 701/55 |
| 2010/0326752 A1 | * | 12/2010 | Lamperth | 180/65.245 |

OTHER PUBLICATIONS

Mashadi et al., "Dual-Mode Power-Split Transmission for Hybrid Electric Vehicles", IEEE Transactions on Vehicular Technology, vol. 59 No. 7, Sep. 2010, pp. 3223-3232.*
Zeng et al., "Modeling and dynamic simulation of a virtual prototype for applying automobile differential into hybrid electric vehicle as power-slit device", 2010 International Conference on Computer Application and System Modeling (ICCASM), vol. 3, Oct. 2010, pp. 82-87.*

* cited by examiner

*Primary Examiner* — James Trammell
*Assistant Examiner* — Todd Melton
(74) *Attorney, Agent, or Firm* — Bacon & Thomas, PLLC

(57) ABSTRACT

The present invention is through an epicyclic gear set and a controllable brake device to structure the clutch function, so as to replace the conventional friction type electromagnetic clutch device, and combined with two or more than two of one or more rotary kinetic power device to constitute a hybrid power train having epicyclic type clutch device.

22 Claims, 5 Drawing Sheets

HYBRID POWER TRAIN HAVING EPICYCLIC TYPE CLUTCH DEVICE

BACKGROUND OF THE INVENTION (a) Field of the Invention

The present invention is through an epicyclic gear set and a controllable brake device to structure the clutch function, so as to replace the conventional friction type electromagnetic clutch device, and combined with two or more than two of one or more rotary kinetic power device to constitute a hybrid power train having epicyclic type clutch device.

(b) Description of the Prior Art

A friction type electromagnetic clutch device is often installed between conventional automatic or semi-automatic power trains or hybrid power trains for performing engagement or disengagement, so that the power train is enabled to perform various functional operations; however, when the friction type electromagnetic clutch device is in a disengaged state, residual torque may remain, and thereby to cause power loss and system malfunction.

SUMMARY OF THE INVENTION

The present invention provides a hybrid power train having epicyclic type clutch device, in which the controllable brake device is used to control the power train having the epicyclic gear set serving as a clutch device, which can be widely applied in a hybrid power train with dual rotary kinetic power devices composed of an engine (ICE100) and a rotational electric machine mainly served as motor function (EM102), or a hybrid power train with triple rotary kinetic power sources composed of an engine (ICE100) and a rotational electric machine mainly served as power generator function (EM101) and a rotational electric machine mainly served as motor function (EM102), wherein the structural configuration of each rotary kinetic power device combining with a transmission device includes a coaxial in-series structure or a multiple axial in-parallel structure for satisfying the requirement of applied space.

DESCRIPTION OF MAIN COMPONENT SYMBOLS

A101、A111、A201: Rocker arm
AS101、AS201: Sleeve type rotation shaft

BK101、BK102、BK103、BK104: Controllable brake device
CCU101: Central control unit
ECU101: Drive electric circuit unit
EG101、EG201 Epicyclic gear set
EM101: Rotational electric machine mainly served as power generator function
EM102: Rotational electric machine mainly served as motor function
ESD101: Electricity storage device
FC101: Fuel control device
G101: Power generator
H100: Housing
ICE100: Engine
ICEC101: Engine operation control device
ING101: Ignition device
OP101: Operation interface
REG101: Regulation device
S101、S102、S110、S201、S202、S1011、S1012、S1013、S1024、S1025、S1026、S1031、S1032、S1051、S1052: Rotation shaft
SB101: Start battery
SM101: Start motor
SS101: Start switch
T1: First transmission device
T200: Transmission unit
T300: Planetary gear set
TANK101: Fuel tank
W101、W201: Input wheel
W102、W202: Output wheel
W103、W203: Epicyclic wheel
W111: Sun wheel
W112: Planetary wheel
W113: Outer annular wheel

DETAILED DESCRIPTION OF THE PREFERRED EMBODIMENTS

A friction type electromagnetic clutch device is often installed between conventional automatic or semi-automatic power trains or hybrid power trains for performing engagement or disengagement, so that the power train is enabled to perform various functional operations; however, when the friction type electromagnetic clutch device is in a disengaged state, residual torque may remain, and thereby to cause power loss and system malfunction.

The present invention is through an epicyclic gear set and a controllable brake device to structure the clutch function, so as to replace the conventional friction type electromagnetic clutch device, and combined with two or more than two of one or more rotary kinetic power device to constitute a hybrid power train having epicyclic type clutch device.

The present invention provides a hybrid power train having epicyclic type clutch device, in which the controllable brake device is used to control the power train having the epicyclic gear set serving as a clutch device, which can be widely applied in a hybrid power train with dual rotary kinetic power devices composed of an engine (ICE100) and a rotational electric machine mainly served as motor function (EM102), or a hybrid power train with triple rotary kinetic power sources composed of an engine (ICE100) and a rotational electric machine mainly served as power generator function (EM101) and a rotational electric machine mainly served as motor function (EM102), wherein the structural configuration of each rotary kinetic power device combining with a transmission device includes a coaxial in-series structure or a multiple axial in-parallel structure for satisfying the requirement of applied space.

Figure 1:
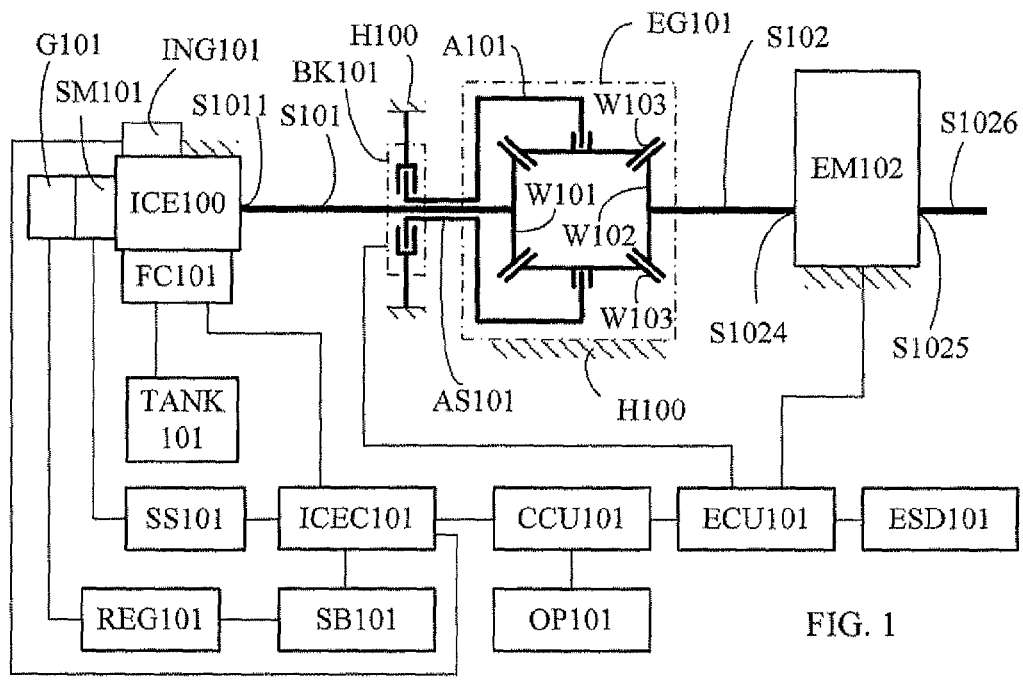
FIG. 1 is a schematic structural view showing a rocker arm (A101) and a sleeve type rotation shaft (AS101) driven by an engine (ICE100) and an epicyclic wheel (W103) of an epicyclic gear set (EG101) being combined with a controllable brake device (BK101), and an input wheel (W102) of the epicyclic gear set (EG101) and an output/input end of a rotation shaft (S102) being combined with a rotational electric machine mainly served as motor function (EM102) and an output/input end rotation shaft (S1026), according to one embodiment of the present invention.

The structures and embodiments of the hybrid power train having epicyclic type clutch device are as followings:

FIG. 1 is a schematic structural view showing a rocker arm (A101) and a sleeve type rotation shaft (AS101) driven by an engine (ICE100) and an epicyclic wheel (W103) of an epicyclic gear set (EG101) being combined with a controllable brake device (BK101), and an input wheel (W102) of the epicyclic gear set (EG101) and an output/input end of a rotation shaft (S102) being combined with a rotational electric machine mainly served as motor function (EM102) and an output/input end rotation shaft (S1026), according to one embodiment of the present invention.

As shown in FIG. 1, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

One end of the rotation shaft (S101) is combined with the input wheel (W101) of the epicyclic gear set (EG101), the other end of the rotation shaft (S101) is combined with an output/input end rotation shaft (S1011) of the engine (ICE100), and the rotation shaft (S102) combined with the output wheel (W102) of the epicyclic gear set (EG101) is served as an output/input end for being combined with an output/input end rotation shaft (S1024) of the rotational electric machine mainly served as motor function (EM102), the other output/input end rotation shaft (S1025) of the rotational electric machine mainly served as motor function (EM102) is combined with a rotation shaft (S1026) for being served as an output/input end;

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing functions between the rotation shaft (S101) and the rotation shaft (S102) are enabled to be controlled, so as to further control the operation relation between the engine (ICE100), the rotational electric machine mainly served as motor function (EM102) and the rotation shaft (S1026); for example controlling one or both of the engine (ICE100) and the rotational electric machine mainly served as motor function (EM102) to drive the rotation shaft (S1026);

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as motor function (EM102) to operate as the motor function, or to control the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery, or the capacitor, or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 2:
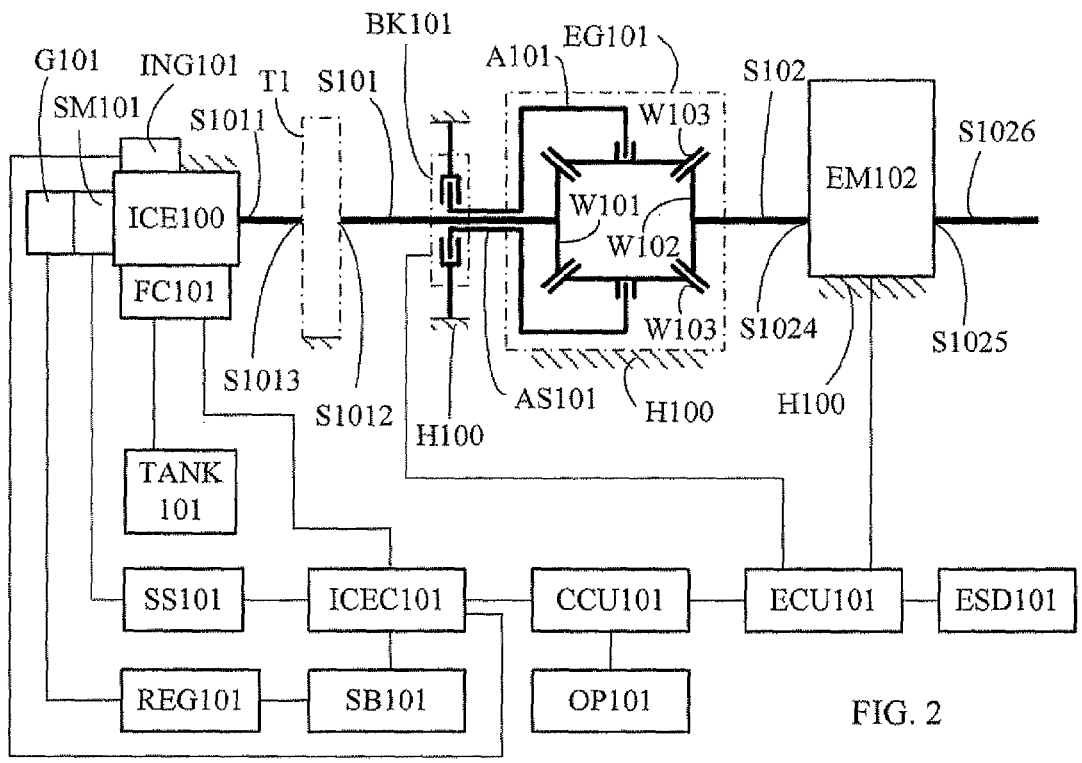
FIG. 2 is a schematic view showing the structure shown in FIG. 1 wherein a first transmission device (T1) being installed between the engine (ICE100) and the controllable brake device (BK101), and the input wheel (W102) of the epicyclic gear set (EG101) and the output/input end of the rotation shaft (S102) being combined with the rotational electric machine mainly served as motor function (EM102) and the output/input end rotation shaft (S1026), according to one embodiment of the present invention.

FIG. 2 is a schematic view showing the structure shown in FIG. 1 wherein a first transmission device (T1) being installed between the engine (ICE100) and the controllable brake device (BK101), and the input wheel (W102) of the epicyclic gear set (EG101) and the output/input end of the rotation shaft (S102) being combined with the rotational electric machine mainly served as motor function (EM102) and the output/input end rotation shaft (S1026), according to one embodiment of the present invention.

As shown in FIG. 2, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

First transmission device (T1): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

The other end of the rotation shaft (S101) combined with the input wheel (W101) of the epicyclic gear set (EG101) is combined with the output/input end rotation shaft (S1012) of the first transmission device (T1), and the output/input end rotation shaft (S1013) at the other end of the first transmission device (T1) is combined with the output/input end rotation shaft (S1011) of the engine (ICE100);

The rotation shaft (S102) combined with the output wheel (W102) of the epicyclic gear set (EG101) is combined with the output/input end rotation shaft (S1024) of the rotational electric machine mainly served as motor function (EM102), and the output/input end rotation shaft (S1025) at the other end of the rotational electric machine mainly served as motor function (EM102) is combined with the rotation shaft (S1026);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing functions between the rotation shaft (S101) and the rotation shaft (S102) are enabled to be controlled, so as to further control the operation relation between the engine (ICE100), the rotational electric machine mainly served as motor function (EM102) and the rotation shaft (S1026); for example controlling one or both of the engine (ICE100) and the rotational electric machine mainly served as motor function (EM102) to drive the rotation shaft (S1026);

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as motor function (EM102) to operate as the motor function, or to control the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery, or the capacitor, or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 3:
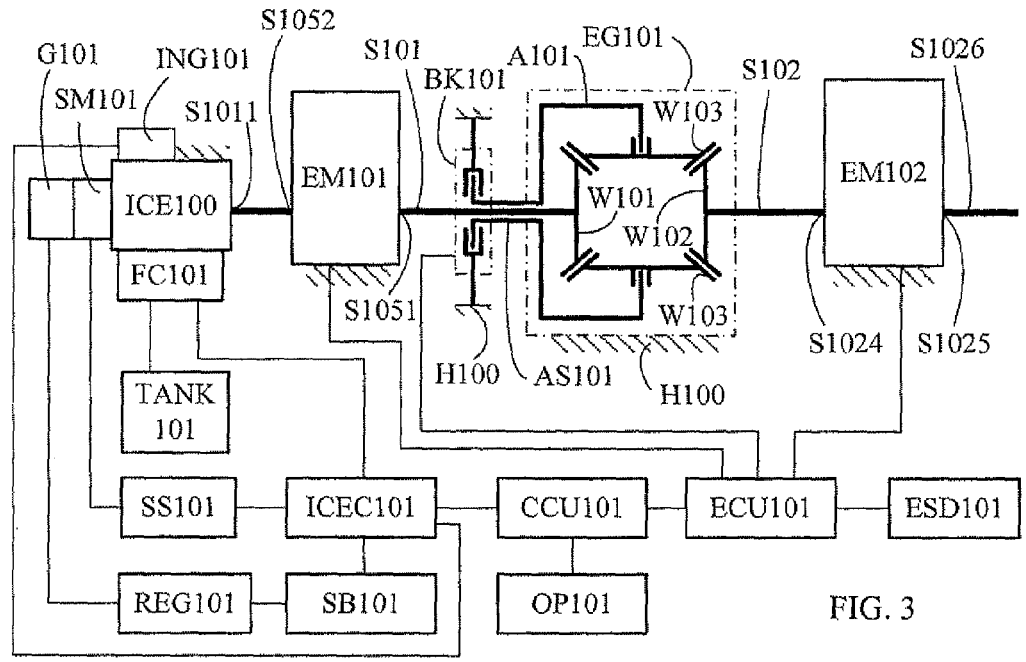
FIG. 3 is a schematic view showing the rotational electric machine mainly served as power generator function (EM101) being installed between the engine (ICE100) and the controllable brake device (BK101) shown in FIG. 1, according to one embodiment of the present invention.

FIG. 3 is a schematic view showing the rotational electric machine mainly served as power generator function (EM101)

being installed between the engine (ICE100) and the controllable brake device (BK101) shown in FIG. 1, according to one embodiment of the present invention.

As shown in FIG. 3, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Rotational electric machine mainly served as power generator function (EM101): which is constituted by a rotational electric machine, or constituted by a rotational electric machine combining with a transmission unit, mainly having the power generator function from the inputting rotary mechanical kinetic energy, and also having the motor function for converting the input electric power into mechanical rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

The other end of the rotation shaft (S101) combined with the input wheel (W101) of the epicyclic gear set (EG101) is combined to the output/input end rotation shaft (S1051) of the rotational electric machine mainly served as power generator function (EM101);

The rotation shaft (S102) combined with the output wheel (W102) of the epicyclic gear set (EG101) is combined with the output/input end rotation shaft (S1024) of the rotational electric machine mainly served as motor function (EM102), and the output/input end rotation shaft (S1025) at the other end of the rotational electric machine mainly served as motor function (EM102) is combined with the rotation shaft (S1026) for serving as the output/input end;

The output/input end rotation shaft (S1011) of the engine (ICE100) is combined with the output/input end rotation shaft (S1052) of the rotational electric machine mainly served as power generator function (EM101), and the other output/input end rotation shaft (S1051) of the rotational electric machine mainly served as power generator function (EM101) is combined with the rotation shaft (S101) combined with the input wheel (W101) of the epicyclic gear set (EG101);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing functions between the rotation shaft (S101) and the rotation shaft (S102) are enabled to be controlled, so as to further control the operation relation between the engine (ICE100), the rotational electric machine mainly served as power generator function (EM101), the rotational electric machine mainly served as motor function (EM102) and the rotation shaft (S1026); for example controlling one or both of the engine (ICE100) and the rotational electric machine mainly served as motor function (EM102) to drive the rotation shaft (S1026), or the engine (ICE100) drives the rotational electric machine mainly served as power generator function (EM101) to operate as the power generator function, or the rotational electric machine mainly served as power generator function (EM101) is operated as the motor function to actuate and drive the engine (ICE100);

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as motor function (EM102) to operate as the motor function, or to control the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery, or the capacitor, or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 4:
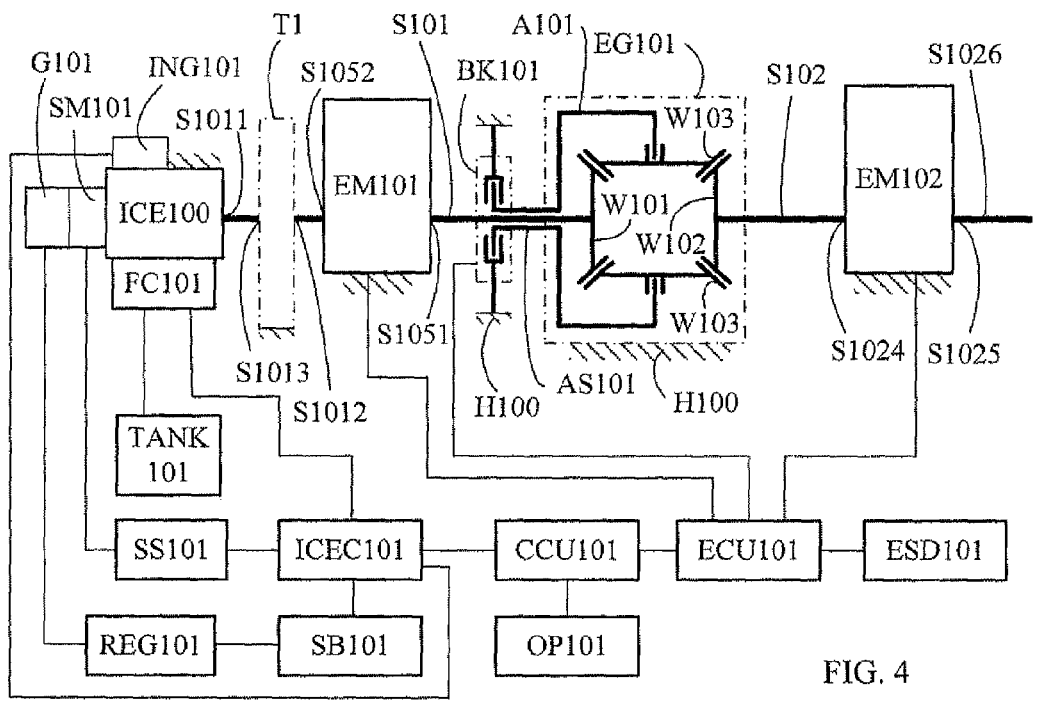
FIG. 4 is a schematic view showing the rotational electric machine mainly served as power generator function (EM101) being installed between the first transmission device (T1) and the controllable brake device (BK101) shown in FIG. 2, according to one embodiment of the present invention.

FIG. 4 is a schematic view showing the rotational electric machine mainly served as power generator function (EM101) being installed between the first transmission device (T1) and the controllable brake device (BK101) shown in FIG. 2, according to one embodiment of the present invention.

As shown in FIG. 4, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Rotational electric machine mainly served as power generator function (EM101): which is constituted by a rotational electric machine, or constituted by a rotational electric machine combining with a transmission unit, mainly having the power generator function from the inputting rotary mechanical kinetic energy, and also having the motor function for converting the input electric power into mechanical rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

First transmission device (T1): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

The other end of the rotation shaft (S101) combined with the input wheel (W101) of the epicyclic gear set (EG101) is combined to the output/input end rotation shaft (S1051) of the rotational electric machine mainly served as power generator function (EM101), and the other output/input end rotation shaft (S1052) of the rotational electric machine mainly served as power generator function (EM101) is combined with the output/input end rotation shaft (S1012) of the first transmission device (T1), and the other output/input end rotation shaft (S1013) of the first transmission device (T1) is combined with the output/input end rotation shaft (S1011) of the engine (ICE100);

The rotation shaft (S102) combined with the output wheel (W102) of the epicyclic gear set (EG101) is combined with the output/input end rotation shaft (S1024) of the rotational electric machine mainly served as motor function (EM102), and the output/input end rotation shaft (S1025) at the other end of the rotational electric machine mainly served as motor function (EM102) is combined with the rotation shaft (S1026) for serving as the output/input end;

The output/input end rotation shaft (S1011) of the engine (ICE100) is combined with the output/input end rotation shaft (S1013) of the first transmission device (T1), the other output/input end rotation shaft (S1012) of the first transmission device (T1) is combined with the output/input end rotation shaft (S1052) of the rotational electric machine mainly served as power generator function (EM101), and the other output/input end rotation shaft (S1051) of the rotational electric machine mainly served as power generator function (EM101) is combined with rotation shaft (S101) combined with the input wheel (W101) of the epicyclic gear set (EG101);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing functions between the rotation shaft (S101) and the rotation shaft (S102) are enabled to be controlled, so as to further control the operation relation between the engine (ICE100), the rotational electric machine mainly served as power generator function (EM101), the rotational electric machine mainly served as motor function (EM102) and the rotation shaft (S1026); for example controlling one or both of the engine (ICE100) and the rotational electric machine mainly served as motor function (EM102) to drive the rotation shaft (S1026), or the engine (ICE100) drives the rotational electric machine mainly served as power generator function (EM101) to operate as the power generator function, or the rotational electric machine mainly served as power generator function (EM101) is operated as the motor function to actuate and drive the engine (ICE100);

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as power generator function (EM101) and the rotational electric machine mainly served as motor function (EM102) to operate as the motor function, or to control the rotational electric machine mainly served as power generator function (EM101) and the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery, or the capacitor, or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 5:
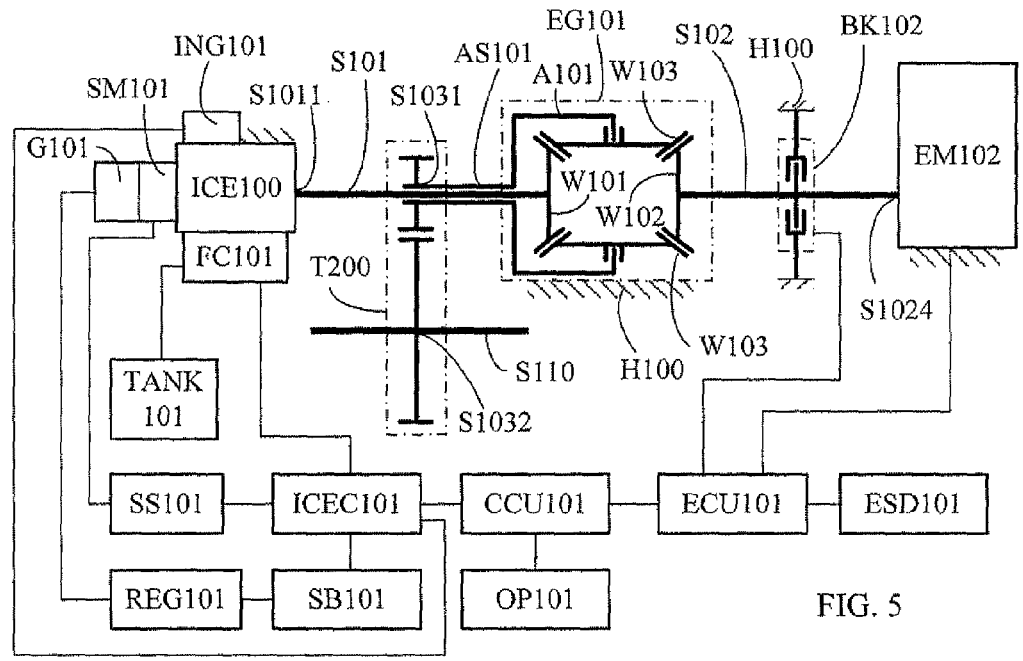
FIG. 5 is a schematic structural view showing the present invention being structured by the engine (ICE100) and a transmission unit (T200) and the epicyclic gear set (EG101) and a controllable brake device (BK102), the output wheel (W102) of the epicyclic gear set (EG101) and the output/input end of the rotation shaft (S102) being combined with the rotational electric machine mainly served as motor function (EM102), the epicyclic wheel (W103) of the epicyclic gear set (EG101) being provided for driving the rocker arm (A101) and the sleeve type rotation shaft (AS101), and the sleeve type rotation shaft (AS101) being used to drive the input end of the transmission unit (T200), and the output end of the transmission unit (T200) being installed with a rotation shaft (S110), according to one embodiment of the present invention.

FIG. 5 is a schematic structural view showing the present invention being structured by the engine (ICE100) and a transmission unit (T200) and the epicyclic gear set (EG101) and a controllable brake device (BK102), the output wheel (W102) of the epicyclic gear set (EG101) and the output/input end of the rotation shaft (S102) being combined with the rotational electric machine mainly served as motor function (EM102), the epicyclic wheel (W103) of the epicyclic gear set (EG101) being provided for driving the rocker arm (A101) and the sleeve type rotation shaft (AS101), and the sleeve type rotation shaft (AS101) being used to drive the input end of the transmission unit (T200), and the output end of the transmission unit (T200) being installed with a rotation shaft (S110), according to one embodiment of the present invention.

As shown in FIG. 5, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Transmission unit (T200): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1011) of the engine (ICE100), the other end of the rotation shaft (S101) is combined with the input wheel (W101) of the epicyclic gear set (EG101), the output/input end rotation shaft (S102) combined with the output wheel (W102) of the epicyclic gear set (EG101) is combined with the controllable brake device (BK102) and combined with the rotational electric machine mainly served as motor function (EM102), and the epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), and the sleeve type rotation shaft (AS101) is used to drive the output/input end rotation shaft (S1031) of the transmission unit (T200), and the other output/input end rotation shaft (S1032) of the transmission unit (T200) is provided for driving the output/input end rotation shaft (S110);

Through controlling the controllable brake device (BK102) to perform brake locking or releasing, the operations of connecting for transmission or releasing functions between the rotation shaft (S101) and the sleeve type rotation shaft (AS101) are enabled to be controlled, so as to further control the operation relation between the engine (ICE100), the rotational electric machine mainly served as motor function (EM102) and the rotation shaft (S110); for example controlling one or both of the engine (ICE100) and the rotational electric machine mainly served as motor function (EM102) to drive the rotation shaft (S110);

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as motor function (EM102) to operate as the motor function, or to control the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery, or the capacitor, or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 6:
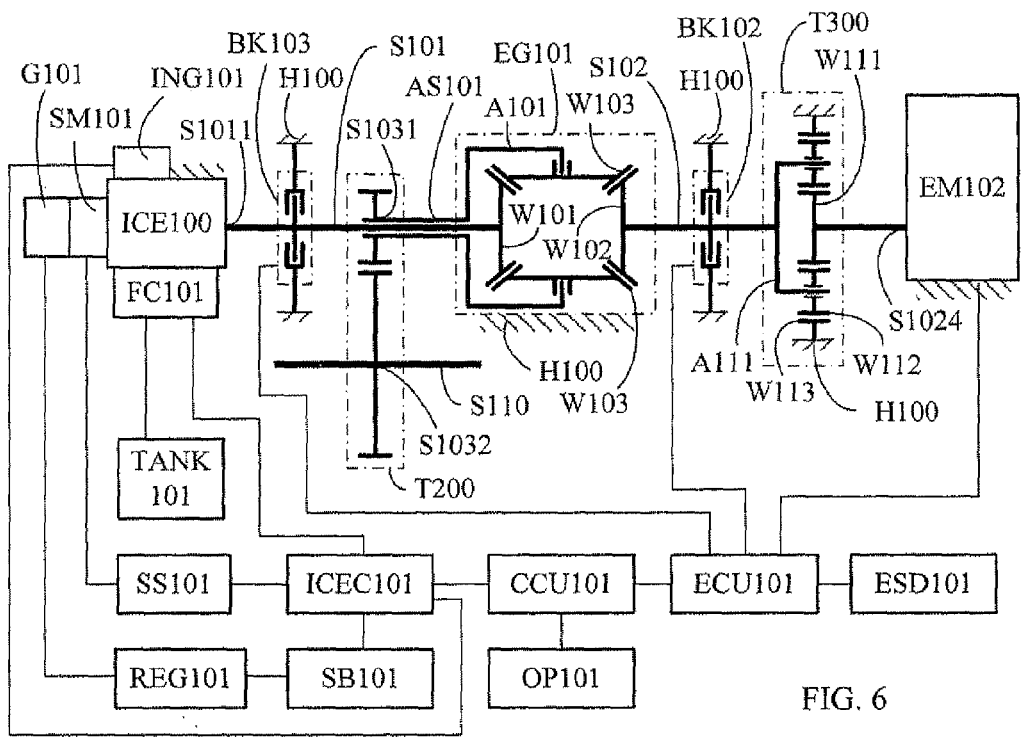
FIG. 6 is a schematic view showing the structure in FIG. 5 in which the input wheel (W101) of the epicyclic gear set (EG101) being combined with the rotation shaft (S101) and combined with the rotation shaft (S1011) of the engine (ICE100), the rotation shaft (S101) being combined to an action side of a controllable brake device (BK103), and the other action end of the controllable brake device (BK103) being fixed in the housing (H100), the output/input end of the rotation shaft (S102) combined with the output wheel (W102) of the epicyclic gear set (EG101) being combined with a rocker arm (A111) of a planetary gear set (T300), an outer annular wheel (W113) of the planetary gear set (T300) being fixed in the housing (H100), a sun wheel (W111) of the planetary gear set (T300) being combined with the rotational electric machine mainly served as motor function (EM102), the epicyclic wheel (W103) of the epicyclic gear set (EG101) being provided for driving the rocker arm (A101) and the sleeve type rotation shaft (AS101), and the sleeve type rotation shaft (AS101) being provided for driving the input end of the transmission unit (T200), according to one embodiment of the present invention.

FIG. 6 is a schematic view showing the structure in FIG. 5 in which the input wheel (W101) of the epicyclic gear set (EG101) being combined with the rotation shaft (S101) and combined with the rotation shaft (S1011) of the engine (ICE100), the rotation shaft (S101) being combined to an action side of a controllable brake device (BK103), and the other action end of the controllable brake device (BK103) being fixed in the housing (H100), the output/input end of the rotation shaft (S102) combined with the output wheel (W102) of the epicyclic gear set (EG101) being combined with a rocker arm (A111) of a planetary gear set (T300), an outer annular wheel (W113) of the planetary gear set (T300) being fixed in the housing (H100), a sun wheel (W111) of the planetary gear set (T300) being combined with the rotational electric machine mainly served as motor function (EM102), the epicyclic wheel (W103) of the epicyclic gear set (EG101) being provided for driving the rocker arm (A101) and the sleeve type rotation shaft (AS101), and the sleeve type rotation shaft (AS101) being provided for driving the input end of the transmission unit (T200), according to one embodiment of the present invention.

As shown in FIG. 6, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Transmission unit (T200): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

Planetary gear set (T300): which is constituted by a sun wheel (W111), a planetary wheel (W112), an outer annular wheel (W113) composed of friction wheels or gears, and a shell fixed in the housing (H100), wherein the outer annular wheel (W113) is fixed in the shell then fixed in the housing or directly fixed in the housing, the planetary wheel (W112) is combined with the rocker arm (A111) and connected to the rotation shaft (S102), and the sun wheel (W111) is connected to the output/input end rotation shaft (S1024) of the rotational electric machine mainly served as motor function (EM102);

The output/input end rotation shaft (S102) combined with the output wheel (W102) of the epicyclic gear set (EG101) is combined to an action side of the controllable brake device (BK102), the other action side of the controllable brake device (BK102) is fixed in the housing (H100), and the other end of the rotation shaft (S102) is connected to the rocker arm (A 111) driven by the planetary wheel (W112) of the planetary gear set (T300);

The epicyclic wheel (W103) of the epicyclic gear set (EG101) is connected to the rocker arm (A101) and connected to the sleeve type rotation shaft (AS101), the sleeve type rotation shaft (AS101) rotates on the rotation shaft (S101) and drives the output/input end rotation shaft (S1031) of the transmission unit (T200), and the other output/input end rotation shaft (S1032) of the transmission unit (T200) is provided for driving the rotation shaft (S110);

The output/input end rotation shaft (S1011) of the engine (ICE100) is connected to the rotation shaft (S101), the rotation shaft (S101) is connected to the input wheel (W101) of the epicyclic gear set (EG101), as well as connected to an action side of the controllable brake device (BK103), and the other action side of the controllable brake device (BK103) is fixed in the housing (H100);

Through controlling one or both of the controllable brake device (BK102) and the controllable brake device (BK103) to perform brake locking or releasing, the operation relation between the engine (ICE100), the rotational electric machine mainly served as motor function (EM102) and the rotation shaft (S110) is enabled to be controlled; for example controlling the operations of connecting for transmission or releasing functions between the rotation shaft (S101) and the sleeve type rotation shaft (AS101) or between the rotation shaft (S102) and the sleeve type rotation shaft (AS101), one or both of the engine (ICE100) and the rotational electric machine mainly served as motor function (EM102) is further controlled to drive the rotation shaft (S110).

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as motor function (EM102) to operate as the motor function, or to control the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery, or the capacitor, or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 7:
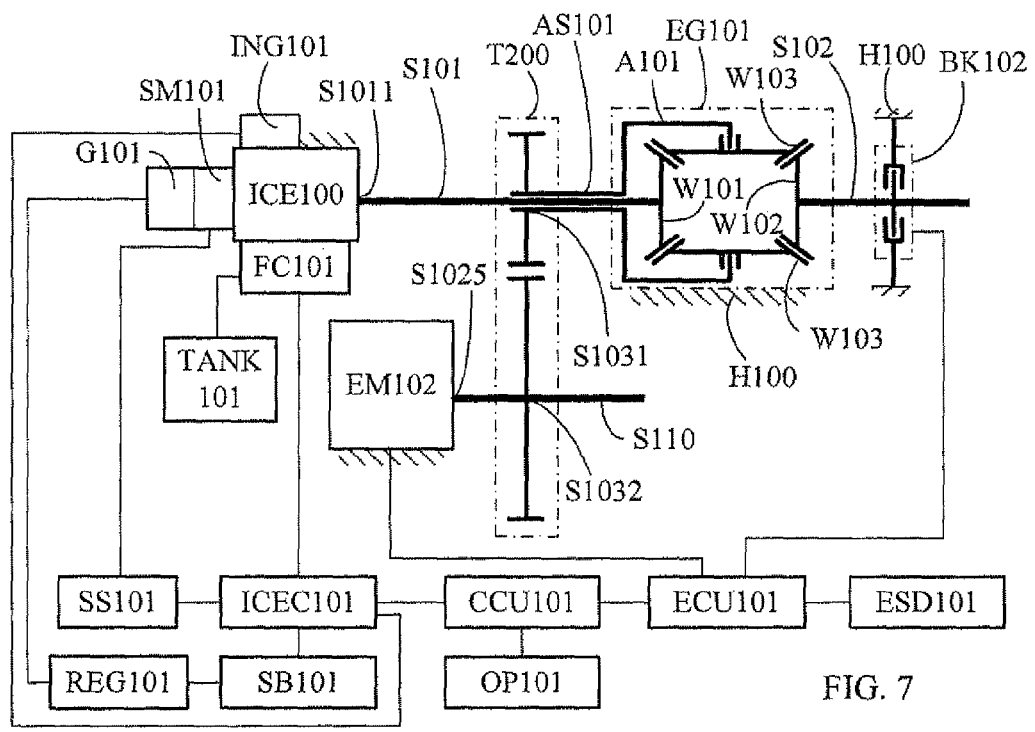
FIG. 7 is a schematic view showing the rotational electric machine mainly served as motor function (EM102) shown in FIG. 5 being installed at one end of the output/input end rotation shaft (S110) of the transmission unit (T200).

FIG. 7 is a schematic view showing the rotational electric machine mainly served as motor function (EM102) shown in FIG. 5 being installed at one end of the output/input end rotation shaft (S110) of the transmission unit (T200).

As shown in FIG. 7, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Transmission unit (T200): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1011) of the engine (ICE100), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), and the sleeve type rotation shaft (AS101) is used to drive the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S1025) of the rotational electric machine mainly served as motor function (EM102), and the other end of the rotation shaft (S110) is served as an output/input end;

Through controlling the controllable brake device (BK102) to perform brake locking or releasing, the operations of connecting for transmission or releasing functions between the rotation shaft (S101) and the sleeve type rotation shaft (AS101) are enabled to be controlled, so as to further control the operation relation between the engine (ICE100), the rotational electric machine mainly served as motor function (EM102) and the rotation shaft (S110); for example controlling one or both of the engine (ICE100) and the rotational electric machine mainly served as motor function (EM102) to drive the rotation shaft (S110).

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as motor function (EM102) to operate as the motor function, or to control the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery, or the capacitor, or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 8:
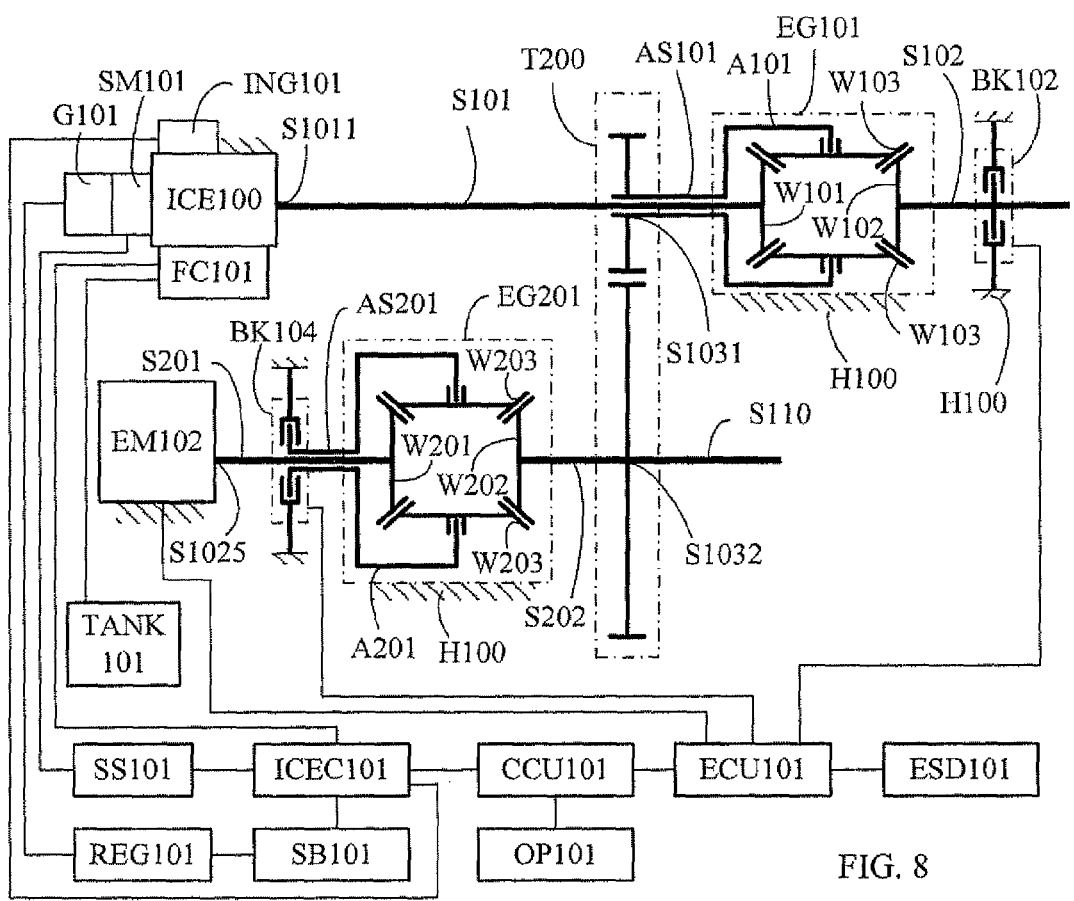
FIG. 8 is a schematic view showing the structure shown in FIG. 7 in which an epicyclic gear set (EG201) and a controllable brake device (BK104) being installed between one end of the output/input end rotation shaft (S110) of the transmission unit (T200) and the rotational electric machine mainly served as motor function (EM102).

FIG. 8 is a schematic view showing the structure shown in FIG. 7 in which an epicyclic gear set (EG201) and a controllable brake device (BK104) being installed between one end of the output/input end rotation shaft (S110) of the transmission unit (T200) and the rotational electric machine mainly served as motor function (EM102).

As shown in FIG. 8, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Epicyclic gear set (EG201): which is constituted by an input wheel (W201) and an output wheel (W202) and at least an epicyclic wheel (W203), and including through bevel gears engaging with each other, or through bevel friction wheel mutually performing friction transmissions to form an epicyclic gear set function, and structured by the rotation shaft (S201), the rotation shaft (S202), the rocker arm (A201), the sleeve type rotation shaft (AS201) and a bearing, and installed with a shell for being combined with the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK104): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS201) or the rocker arm (A201), and the other action side is fixed in the housing (H100);

Transmission unit (T200): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1011) of the engine (ICE100), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), and the sleeve type rotation shaft (AS101) is used to drive the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S202) combined with the output wheel (W202) of the epicyclic gear set (EG201), the other output/input end rotation shaft (S201) combined with the input wheel (W201) of the epicyclic gear set (EG201) is combined with the output/input end rotation shaft (S1025) of the rotational electric machine mainly served as motor function (EM102), and the epicyclic wheel (W203) of the epicyclic gear set (EG201) is provided for driving the rocker arm (A201) and the sleeve type rotation shaft (AS201), the sleeve type rotate shaft (AS201) rotates on the rotation shaft (S201) and is provided for connecting to an action side of the controllable brake device (BK104), the other action side of the controllable brake device (BK104) is fixed in the housing (H100), and the other end of the rotation shaft (S110) is served as an output/input end;

Through controlling one or both of the controllable brake device (BK102) and the controllable brake device (BK104) to perform brake locking or releasing, the operation relation between the engine (ICE100), the rotational electric machine mainly served as motor function (EM102) and the rotation shaft (S110) is enabled to be controlled; for example controlling the operations of connecting for transmission or releasing functions between the rotation shaft (S101) and the sleeve type rotation shaft (AS101) or between the rotation shaft (S201) and the rotation shaft (S202), one or both of the engine (ICE100) and the rotational electric machine mainly served as motor function (EM102) is further controlled to drive the rotation shaft (S110).

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as motor function (EM102) to operate as the motor function, or to control the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery or the capacitor or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 9:
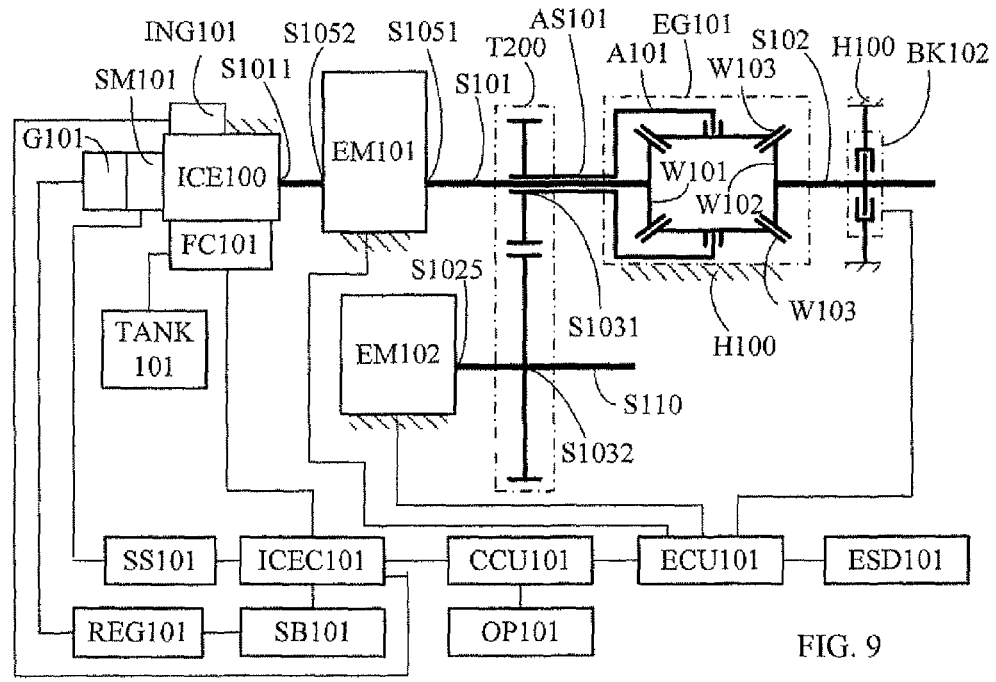
FIG. 9 is a schematic view showing the structure shown in FIG. 7 which the rotational electric machine mainly served as power generator function (EM101) being installed between the engine (ICE100) and the rotation shaft (S101) combined with the input wheel (W101) of the epicyclic gear set (EG101).

FIG. 9 is a schematic view showing the structure shown in FIG. 7 in which the rotational electric machine mainly served as power generator function (EM101) being installed between the engine (ICE100) and the rotation shaft (S101) combined with the input wheel (W101) of the epicyclic gear set (EG101).

As shown in FIG. 9, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Rotational electric machine mainly served as power generator function (EM101): which is constituted by a rotational electric machine, or constituted by a rotational electric machine combining with a transmission unit, mainly having the power generator function for inputting the rotary mechanical kinetic energy, as well as having the motor function for converting the input electric power into the mechanical rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Transmission unit (T200): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1051) of the rotational electric machine mainly served as power generator function (EM101), the rotation shaft (S1052) at the other end of the rotational electric machine mainly served as power generator function (EM101) is combined with the output/input end rotation shaft (S1011) of the engine (ICE100), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), and the sleeve type rotation shaft (AS101) is used to drive the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S1025) of the rotational electric machine mainly served as motor function (EM102), and the other end of the rotation shaft (S110) is served as an output/input end;

The rotation shaft (S101) combined with the input wheel (W101) of the epicyclic gear set (EG101) is combined with the output/input end rotation shaft (S1051) of the rotational electric machine mainly served as power generator function (EM101), and the other output/input end rotation shaft (S1052) of the rotational electric machine mainly served as power generator function (EM101) is combined with the output/input end rotation shaft (S1011) of the engine (ICE100);

Through controlling the controllable brake device (BK102) to perform brake locking or releasing, the operations of connecting for transmission or releasing functions between the rotation shaft (S101) and the sleeve type rotation shaft (AS101) are enabled to be controlled, so as to further control the operation relation between the engine (ICE100), the rotational electric machine mainly served as power generator function (EM101), the rotational electric machine mainly served as motor function (EM102) and the rotation shaft (S110); for example controlling one or both of the engine (ICE100) and the rotational electric machine mainly served as motor function (EM102) to drive the rotation shaft (S110), or the engine (ICE100) drives the rotational electric machine mainly served as power generator function (EM101) to operate as the power generator function, or the rotational electric machine mainly served as power generator function (EM101) is operated as the motor function to actuate and drive the engine (ICE100).

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as power generator function (EM101) and the rotational electric machine mainly served as motor function (EM102) to operate as the motor function, or to control the rotational electric machine mainly served as power generator function (EM101) and the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery or the capacitor or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

Figure 10:
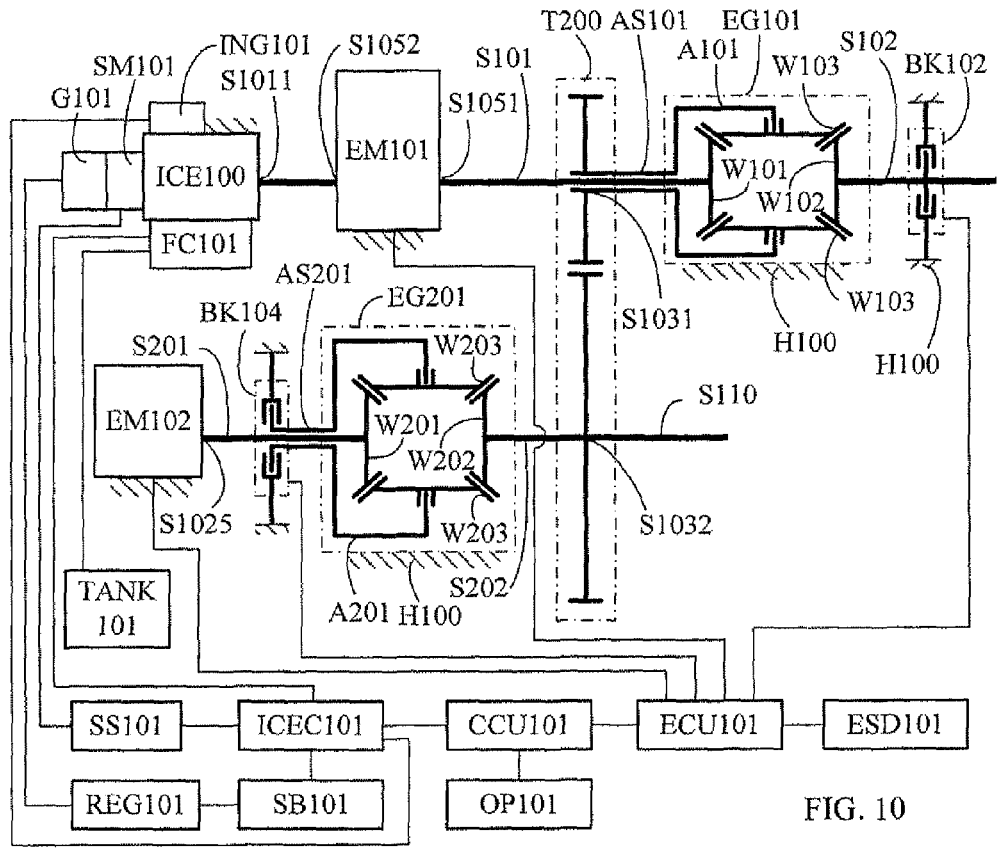
FIG. 10 is a schematic view showing the structure shown in FIG. 9 in which the epicyclic gear set (EG201) and the controllable brake device (BK104) being installed between one end of the output/input end rotation shaft (S110) of the transmission unit (T200) and the rotational electric machine mainly served as motor function (EM102).

FIG. 10 is a schematic view showing the structure shown in FIG. 9 in which the epicyclic gear set (EG201) and the controllable brake device (BK104) being installed between one end of the output/input end rotation shaft (S110) of the transmission unit (T200) and the rotational electric machine mainly served as motor function (EM102).

As shown in FIG. 10, it mainly consists of:

Engine (ICE100): which is constituted by a rotary kinetic power source capable of generating rotary kinetic power output, including an internal combustion engine, external combustion engine, Sterling engine and turbine engine;

Rotational electric machine mainly served as motor function (EM102): which is constituted by a rotational electric machine, or constituted by a rotational electric machine combined with a transmission unit, mainly having the motor function for converting the input electric power into the rotary mechanical kinetic energy, as well as having the power generator function for reversely inputting the rotary kinetic energy;

Rotational electric machine mainly served as power generator function (EM101): which is constituted by a rotational electric machine, or constituted by a rotational electric machine combining with a transmission unit, mainly having the power generator function for inputting the rotary mechanical kinetic energy, as well as having the motor function for converting the input electric power into the mechanical rotary kinetic energy;

Epicyclic gear set (EG101): which is constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A 101), the sleeve type rotation shaft (AS101) and a bearing, and installed with a shell for being combined with the housing (H100);

Epicyclic gear set (EG201): which is constituted by an input wheel (W201) and an output wheel (W202) and at least an epicyclic wheel (W203), and including through bevel gears engaging with each other, or through bevel friction wheel mutually performing friction transmissions to form an epicyclic gear set function, and structured by the rotation shaft (S201), the rotation shaft (S202), the rocker arm (A201), the sleeve type rotation shaft (AS201) and a bearing, and installed with a shell for being combined with the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK104): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS201) or the rocker arm (A201), and the other action side is fixed in the housing (H100);

Transmission unit (T200): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device One end of the rotation shaft (S101) is combined with the output/input end rotation shaft (S1051) of the rotational electric machine mainly served as power generator function (EM101), the rotation shaft (S1052) at the other end of the rotational electric machine mainly served as power generator function (EM101) is combined with the output/input end rotation shaft (S1011) of the engine (ICE100), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), and the sleeve type rotation shaft (AS101) is used to drive the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S202) combined with the output wheel (W202) of the epicyclic gear set (EG201), the other output/input end rotation shaft (S201) combined with the input wheel (W201) of the epicyclic gear set (EG201) is combined with the output/input end rotation shaft (S1025) of the rotational electric machine mainly served as motor function (EM102), and the epicyclic wheel (W203) of the epicyclic gear set (EG201) is provided for driving the rocker arm (A201) and the sleeve type rotation shaft (AS201), the sleeve type rotate shaft (AS201) rotates on the rotation shaft (S201), and the sleeve type rotate shaft (AS201) is connected to an action side of the controllable brake device (BK104), the other action side of the controllable brake device (BK104) is fixed in the housing (H100), and the other end of the rotation shaft (S110) is served as an output/input end;

The rotation shaft (S101) combined with the input wheel (W101) of the epicyclic gear set (EG101) is combined with the output/input end rotation shaft (S1051) of the rotational electric machine mainly served as power generator function (EM101), and the other output/input end rotation shaft (S1052) of the rotational electric machine mainly served as power generator function (EM101) is combined with the output/input end rotation shaft (S1011) of the engine (ICE100);

Through controlling one or both of the controllable brake device (BK102) and the controllable brake device (BK104) to perform brake locking or releasing, the operation relation between the engine (ICE100), the rotational electric machine mainly served as power generator function (EM101), the rotational electric machine mainly served as motor function (EM102) and the rotation shaft (S110) are able to be controlled; for example controlling the operations of connecting for transmission or releasing functions between the rotation shaft (S101) and the sleeve type rotation shaft (AS101) or between the rotation shaft (S201) and the rotation shaft (S202), one or both of the engine (ICE100) and the rotational electric machine mainly served as motor function (EM102) is further controlled to drive to the rotation shaft (S110), or the engine (ICE100) drives the rotational electric machine mainly served as power generator function (EM101) to operate as the power generator function, or the rotational electric machine mainly served as power generator function (EM101) is operated as the motor function to actuate and drive the engine (ICE100).

The above-mentioned system includes a part or all of the following operation and control devices and the peripheral operation assisting devices including:

Start motor (SM101): which is constituted by a brush or brushless DC or AC motor, or constituted by a start motor having power generator function, and through operating a start switch (SS101), the electric power of a start battery (SB101) is controlled to drive the start motor (SM101), for linking the engine (ICE100) directly or via a transmission device;

Start switch (SS101): which is constituted by an electromechanical switch unit or solid state electronic switch unit, for controlling the start battery (SB101) to supply electricity to the start motor (SM101);

Start Battery (SB101): which is constituted by various rechargeable secondary batteries or super capacitors, for providing electric power to the start motor (SM101), and receiving the electric power generated by a power generator (G101) driven by the engine (ICE100) or the external electric power for charging;

Power generator (G101): which is constituted by an AC or DC power generator, and directly linked by the engine or linked via a transmission device for respectively generating relative AC electric power or DC output after being rectified, or directly generating DC electric power for outputting; when the start motor is equipped with the power generator function, the mentioned power generator can be optionally installed;

Regulation device (REG101): which is constituted by an electromechanical or solid state electronic circuit, for respectively regulating the electric power outputted by the power generator (G101) or the electric power outputted while the start motor being operated as the power generator function, so as to charge the start battery (SB101) and supply electric power to other loads;

Ignition device (ING101): which is constituted by the electromechanical circuit component or the solid state electronic circuit component, or constituted through utilizing the two components, for igniting the engine to operate, and controlled by an engine operation control device (ICEC101);

Fuel control device (FC101): which is constituted including a fuel jetting mechanism with opening/closing throttle function to control the fuel jetting width, and a control circuit device capable of controlling the fuel jetting mechanism with respect to the opening degree of throttle, the temperature of engine oil, the temperature of intake air, and the oxygen containment crankshaft (IP-ARB) signals, and is subjected to the control of the engine operation control device (ICEC101);

Fuel tank (TANK101): a storage chamber for storing the fuel required by the engine;

Drive electric circuit unit (ECU101): which is constituted by electromechanical or solid state electronic units for receiving the control commands of a central control unit (CCU101) to drive the rotational electric machine mainly served as power generator function (EM101) and the rotational electric machine mainly served as motor function (EM102) to operate as the motor function, or to control the rotational electric machine mainly served as power generator function (EM101) and the rotational electric machine mainly served as motor function (EM102) to operate as the power generator function, so as to charge an electricity storage device (ESD101) or to output the electric power to other loads;

Central control unit (CCU101): which is constituted by electromechanical or solid state electronic units, for outputting the control command, so as to control the drive electric circuit unit (ECU101) and the engine operation control device (ICEC101);

Electricity storage device (ESD101): constituted by the rechargeable secondary battery or the capacitor or the super capacitor;

Operation interface (OP101): receiving the manual operations or the inputted signals for controlling the central control unit (CCU101) so as to control the hybrid power train having epicyclic type clutch device;

Engine operation control device (ICEC101): receiving the control command of the central control unit (CCU101) to control the operations of actuating, stopping, regulating rotation speed, increasing/decreasing fuel jetted into engine and the ignition of the engine (ICE100); constituted by electromechanical or electronic units and control mechanisms.

The invention claimed is:

1. A hybrid power train having an epicyclic gear set that serves as a clutch device, said hybrid power train coupling an engine (ICE100) and at least one electrical machine (EM102), comprising:

a rocker arm (A101);

a controllable brake device (BK101) for locking and releasing said rocker arm (A101);

an epicyclic gear set (EG101) including at least one epicyclic wheel (W103) an input wheel (W101), and an output wheel (W102), wherein said at least one epicyclic wheel (W103), input wheel (W101), and output wheel (W102) are bevel gears or bevel friction wheels, said at least one epicyclic wheel engaging both said input wheel (W101) and output wheel (W102);

a first rotation shaft (S101) connected to and rotatable with said input wheel (W101); and a second rotation shaft (S102) connected to and rotatable with said output wheel (W102);

an external input/output shaft (S1026) rotatably coupled to an input/output side of at least one electrical machine (EM102); and a cylindrical rotation shaft (AS101) extending from said rocker arm (A101) and coaxial with said first rotation shaft (S101), said cylindrical shaft (AS101) being engaged by said controllable brake device (BK101) to prevent rotation of said rocker arm (A101), wherein said epicyclic wheel (W103) is rotatably mounted on said rocker arm (A101) such that when said controllable brake device (BK101) locks said rocker arm (A101) to prevent rotation thereof, said epicyclic wheel (W103) couples said input wheel (W101) to said output wheel (W102), and when said controllable brake device (BK101) releases said rocker arm (A101), rotation of said input wheel (W101) or output wheel (W102) causes said rocker arm (A101) to rotate, at least partially decoupling said input wheel (W101) from said output wheel (W102), said epicyclic gear set (EG101) thereby serving as a releasable clutch controlled by said controllable brake device (BK101) to control transmission of power between said first rotation shaft (S101) and said second rotation shaft (S102), wherein said first rotation shaft (S101) is rotatably coupled to an engine (ICE100) and said second rotation shaft (S102) is rotatably coupled to said at least one electrical machine (EM102), and wherein said electrical machine (EM102) serves primarily as a motor for converting input electrical power into rotary mechanical energy to drive said external input/output shaft (1026), whereby when said electrical machine (EM102) is driven as a motor and said controllable brake device (BK101) engages said cylindrical shaft (AS101) to prevent rotation of said rocker arm (A101), said engine (ICE100) and said at least one electrical machine (EM102) are coupled through said epicyclic gear set to jointly drive said input/output shaft (1026), and whereby when said controllable brake device (BK101) releases said cylindrical shaft (AS101), said engine (ICE100) is decoupled from said at least one electrical machine (EM102).

2. A hybrid power train as claimed in claim 1, wherein said controllable brake device (BK101) is fixed in a housing (H100) of said epicyclic gear set (EG101).

3. A hybrid power train as claimed in claim 1, wherein said first rotation shaft (S101) and said second rotation shaft (S102) coaxially extend from opposite sides of said epicyclic gear set (EG101).

4. A hybrid power train as claimed in claim 1, wherein said engine is one of an internal combustion engine, external combustion engine, Sterling engine, and turbine engine.

5. A hybrid power train as claimed in claim 1, wherein said electrical machine (EM102) is combined with a transmission unit.

6. A hybrid power train as claimed in claim 1, wherein said electrical machine (EM102) has a secondary generator function for converting input rotary mechanical energy into electrical power.

7. A hybrid power train as claimed in claim 1, further comprising at least one of the following operation and control devices:
 a starter motor (SM101) connected to the engine (ICE100);
 a starter switch (SS101) for controlling supply of electricity from a starter battery (SB101) to the starter motor (SM101) and supplied with external charging power or electrical power from a power generator (G101) driven by the engine (ICE100);
 a regulation device (REG101) for regulating electric power generated by the power generator (G101) or by the starter motor (SM101) when the starter motor (SM101) is operated as a generator;
 an ignition device (ING101) and engine operation control device (ICEC101) for controlling operation of the engine (ICE100);
 a fuel control device (FC101) controlled by the engine operation control device (ICEC101) for controlling supply of fuel to the engine (ICE100);
 a fuel tank (TANK101) for storing a fuel supply for the engine (ICE100);
 a drive electric circuit unit (ECU101) for controlling operation of the at least one electrical machine (EM102) and said controllable brake device (BK101);
 a central control unit (CCU101) for controlling the drive electric circuit unit (ECU101) and the engine operation control device (ICEC101);
 an electricity storage device (ESD101) for supplying electricity to the at least one electrical machine (EM102) through the drive electric circuit unit (ECU101); and
 an operation interface (OP101) for receiving control signals or manual inputs to the central control unit (CCU101) to control the hybrid power train.

8. A hybrid power train as claimed in claim 1, wherein said first rotation shaft (S101) is rotatably coupled to the engine (ICE100) through a transmission device (T1) installed between the engine (ICE100) and the first rotation shaft (S101), said transmission device (T1) including an automatic, manumatic, semi-automatic, or manual gear shifting device and at least one of the following elements: gears, friction wheels, pulleys and belts, chains and chain wheels, a planetary transmission gear set, and epicyclic transmission gear set, a continuously variable transmission (CVT), and a hydraulic transmission device.

9. A hybrid power train as claimed in claim 1, further comprising a second rotational electric machine (EM101) that serves primarily as an electrical power generator, and that is connected between the engine (ICE100) and the epicyclic gear set (EG101) to be driven by the engine and, selectively through the output wheel (W102) and the output shaft (S102) of the epicyclic gear set (EG101), to connect to the at least one electrical machine (EM102).

10. A hybrid power train as claimed in claim 9, wherein said at least one electrical machine (EM102) is selectively driven as a motor by electrical power generated by the second electrical machine (EM101) though an drive electric circuit unit (ECU101) to drive an external input/output shaft (S1026).

11. A hybrid power train as claimed in claim 9, further comprising a transmission device (T1) installed between the second electrical machine (EM101) and the engine (ICE100), said transmission device (T1) including an automatic, manumatic, semi-automatic, or manual gear shifting device and at least one of the following elements: gears, friction wheels, pulleys and belts, chains and chain wheels, a planetary transmission gear set, and epicyclic transmission gear set, a continuously variable transmission (CVT), and a hydraulic transmission device.

12. A hybrid power train having an epicyclic gear set that serves as a clutch device, said hybrid power train coupling an engine (ICE100) and at least one electrical machine (EM102), comprising:
 a rocker arm (A101);
 an epicyclic gear set (EG101) including at least one epicyclic wheel (W103) an input wheel (W101), and an output wheel (W102), wherein said at least one epicyclic wheel (W103), input wheel (W101), and output wheel (W102) are bevel gears or bevel friction wheels, said at least one epicyclic wheel engaging both said input wheel (W101) and output wheel (W102);
 a first rotation shaft (S101) connected to and rotatable with said input wheel (W101);
 a second rotation shaft (S102) connected to and rotatable with said output wheel (W102);
 a transmission device (T200) including a cylindrical first output/input end rotation shaft rotatably coupled to the rocker arm (A101) and a second output/input end rotation shaft (S1032) coupled to an external output/input rotation shaft (S110), said transmission device transmitting power between said external output/input rotation shaft (S110) and said rocker arm (A101);
 a controllable brake device (BK102) for locking and releasing said second rotation shaft (S102);
 wherein said epicyclic wheel (W103) is rotatably mounted on said rocker arm (A101) such that when said controllable brake device (BK102) locks said second rotation shaft (S102) to prevent rotation of the output wheel (W102), said epicyclic wheel (W103) transmits power between said input wheel (W101) and said rocker arm (A101) to transfer power exclusively between said first rotation shaft (S101) and said external output/input rotation shaft (S110), and when said controllable brake device (BK102) releases said second rotation shaft (S102), said epicyclic wheel (W103) transfers power to both said input wheel (W101) or output wheel (W102), thereby enabling transfer of power between said first rotation shaft (S101), said second rotation shaft (S102), and said external output/input shaft (S110), said epicyclic gear set (EG101) thereby serving as a releasable clutch controlled by said controllable brake device (BK102) to control transmission of power between said first rotation shaft (S101), said second rotation shaft (S102), and said external output/input shaft (S110),
 wherein said first rotation shaft (S101) is rotatably coupled to an engine (ICE100) and the epicyclic gear set (EG101), and through said external output/input shaft (S110) of said transmission device T200) is rotatably coupled to at least one electrical machine (EM102).

13. A hybrid power train as claimed in claim 12, wherein said transmission unit (T2) includes an automatic, manumatic, semi-automatic, or manual gear shifting device and at least one of the following elements: gears, friction wheels, pulleys and belts, chains and chain wheels, a planetary transmission gear set, and epicyclic transmission gear set, a continuously variable transmission (CVT), and a hydraulic transmission device.

14. A hybrid power train as claimed in claim 12, wherein said controllable brake device (BK102) is fixed in a housing (H100) of said epicyclic gear set (EG101).

15. A hybrid power train as claimed in claim 12, wherein said first rotation shaft (S101) and said second rotation shaft (S102) coaxially extend from opposite sides of said epicyclic gear set (EG101).

16. A hybrid power train as claimed in claim 12, wherein said engine is one of an internal combustion engine, external combustion engine, Sterling engine, and turbine engine.

17. A hybrid power train as claimed in claim 12, wherein said electrical machine (EM102) serves primarily as a motor for converting input electrical power into rotary mechanical energy.

18. A hybrid power train as claimed in claim 17, wherein said electrical machine (EM102) is combined with a transmission unit.

19. A hybrid power train as claimed in claim 17, wherein said electrical machine (EM102) has a secondary generator function for converting input rotary mechanical energy into electrical power.

20. A hybrid power train as claimed in claim 12, further comprising at least one of the following operation and control devices:
- a starter motor (SM101) connected to the engine (ICE100);
- a starter switch (SS101) for controlling supply of electricity from a starter battery (SB101) to the starter motor (SM101) and supplied with external charging power or electrical power from a power generator (G101) driven by the engine (ICE100);
- a regulation device (REG101) for regulating electric power generated by the power generator (G101) or by the starter motor (SM101) when the starter motor (SM101) is operated as a generator;
- an ignition device (ING101) and engine operation control device (ICEC101) for controlling operation of the engine (ICE100);
- a fuel control device (FC101) controlled by the engine operation control device (ICEC101) for controlling supply of fuel to the engine (ICE100);
- a fuel tank (TANK101) for storing a fuel supply for the engine (ICE100);
- a drive electric circuit unit (ECU101) for controlling operation of the at least one electrical machine (EM102) and said controllable brake device (BK102);
- a central control unit (CCU101) for controlling the drive electric circuit unit (ECU101) and the engine operation control device (ICEC101);
- an electricity storage device (ESD101) for supplying electricity to the at least one electrical machine (EM102) through the drive electric circuit unit (ECU101); and
- an operation interface (OP101) for receiving control signals or manual inputs to the central control unit (CCU101) to control the hybrid power train.

21. A hybrid power train as claimed in claim 12, wherein said at least one electrical machine is rotatably coupled to said external output/input shaft (S110) through a second epicyclic gear set (EG210), said second epicyclic gear set (EG201) including:
- at least one second epicyclic wheel (W203) rotatably mounted on a second rocker arm (A201), a second input wheel (W201) connected to an rotatable with an input rotation shaft (S201) rotatably connected to the at least one electrical machine (EM102), and a second output wheel (W202) rotatably connected to the external output/input shaft (S110) or the second transmission unit (T200), wherein said at least one second epicyclic wheel (W203), second input wheel (W201), and second output wheel (W202) are bevel gears or bevel friction wheels, said at least one second epicyclic wheel engaging both said second input wheel (W201) and second output wheel (W202),
- wherein when a second controllable brake device (BK104) locks said input rotation shaft (S201) to prevent rotation of the second output wheel (W202), said second epicyclic wheel (W203) transmits power between said second input wheel (W201) and said second rocker arm (A201) to transfer power exclusively between said input rotation shaft (S201) and said external output/input rotation shaft (S110), and when said second controllable brake device (BK104) releases said input rotation shaft (S201), rotation of said second input wheel (W201) or second output wheel (W202) causes said second rocker arm (A201) to rotate, at least partially decoupling said second input wheel (W201) from said second output wheel (W202), said second epicyclic gear set (EG201) thereby serving as a second releasable clutch controlled by said second controllable brake device (BK104) to control transmission of power between said input rotation shaft (S201) and said external output/input rotation shaft (S110).

22. A hybrid power train as claimed in claim 12, further comprising a second rotational electric machine (EM101) that serves primarily as an electrical power generator, and that is connected between the engine (ICE100) and the first epicyclic gear set (EG101) to be driven by the engine and, selectively through the cylindrical rotation shaft (AS101) linked by the epicyclic wheel (W103) of the first epicyclic gear set (EG101) and through the transmission device (T200) to drive the electrical machine (EM102) directly, or to drive the electrical machine (EM102) through a second input wheel (W201) or an input rotation shaft (S102) of a second epicyclic gear set (EG201) to drive the electrical machine (EM102).

* * * * *